United States Patent [19]

Rees

[11] Patent Number: 4,487,459
[45] Date of Patent: Dec. 11, 1984

[54] SEAT SLIDE STRUCTURE

[75] Inventor: Richard W. A. Rees, West Bloomfield, Mich.

[73] Assignee: General Motors Corporation, Detroit, Mich.

[21] Appl. No.: 510,374

[22] Filed: Jul. 1, 1983

[51] Int. Cl.³ .............. F16C 29/10; F16M 13/00; B60N 1/08
[52] U.S. Cl. .............. 308/3 R; 308/3.6; 248/429; 296/65 R
[58] Field of Search .............. 308/3.6, 3 R, 3 A; 296/63, 65 R; 248/424, 429, 430; 297/311

[56] References Cited

U.S. PATENT DOCUMENTS

| | | | |
|---|---|---|---|
| 2,927,627 | 3/1960 | Lohr | 248/429 |
| 3,171,698 | 3/1965 | Campbell | 308/3.8 |
| 3,279,737 | 10/1966 | Krause | 248/430 |
| 3,350,046 | 10/1967 | Kirk | 248/430 |
| 3,393,019 | 7/1968 | Fraser et al. | 308/3.6 |
| 4,291,856 | 9/1981 | Urai | 308/3 R X |

FOREIGN PATENT DOCUMENTS 2351574  5/1974  Fed. Rep. of Germany ...... 248/429

Primary Examiner—Stuart S. Levy
Assistant Examiner—Thomas R. Hannon
Attorney, Agent, or Firm—Herbert Furman

[57] ABSTRACT

A seat slide structure includes upper and lower track members having U-shaped leg portions which interfit with each other. The track members are spaced and laterally located by plastic slides which fit between the base of the upper track member and the bights of the legs of the lower track member. A locking plate is vertically movable within the upper track member and includes spaced pairs of locking portions engageable with spaced pairs of locking notches in the bights of the legs of the lower track member to provide a dual latch locking the upper track member in a horizontal position relative to the lower track member. The latch member is releasably biased to locked position and is released by a locking lever engageable therewith upon pivoting movement of the lever relative to the upper track member.

4 Claims, 6 Drawing Figures

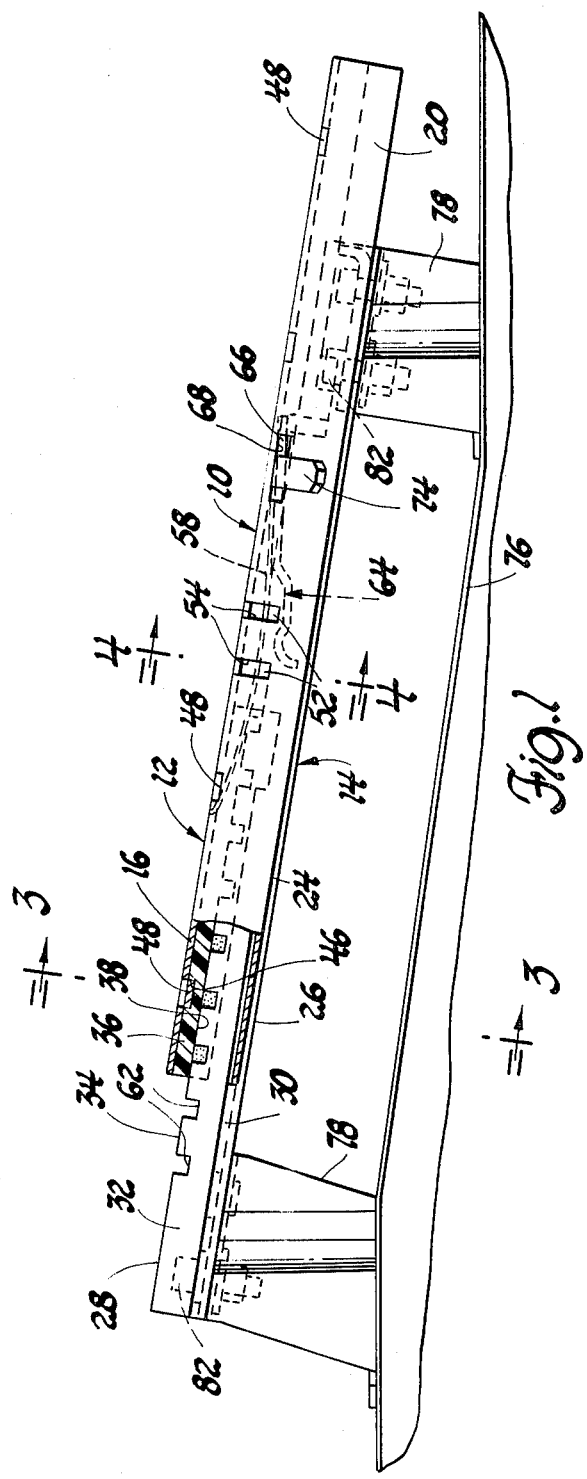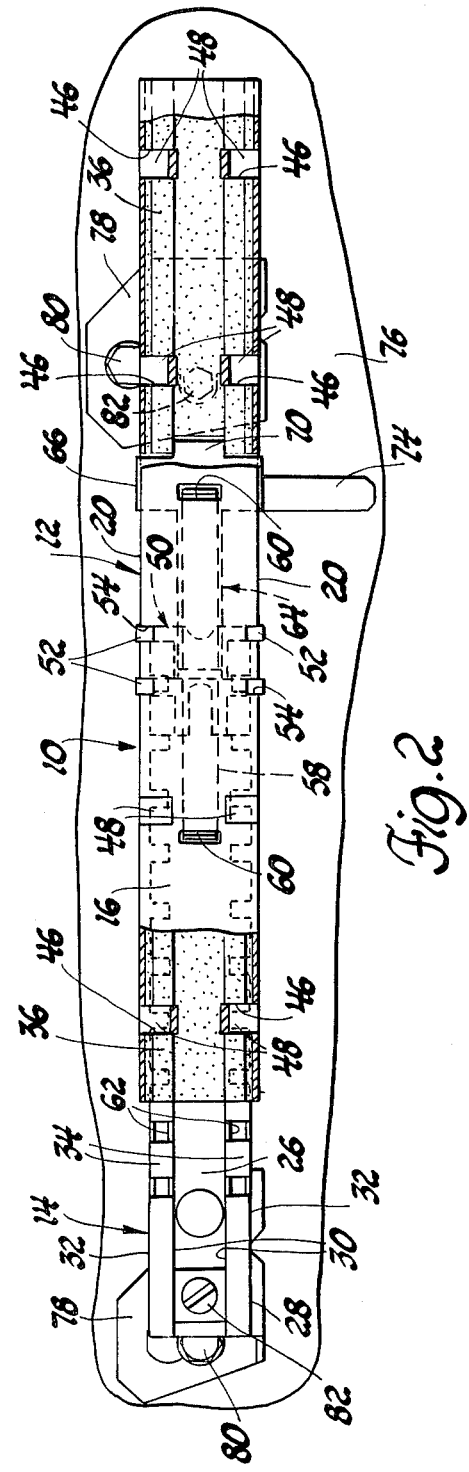

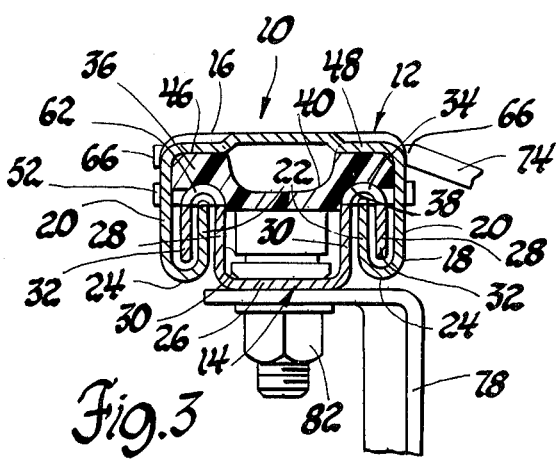
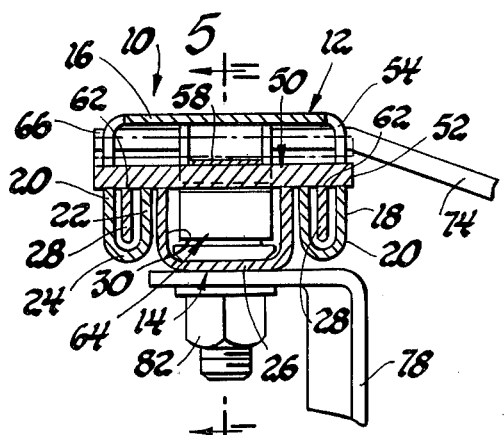
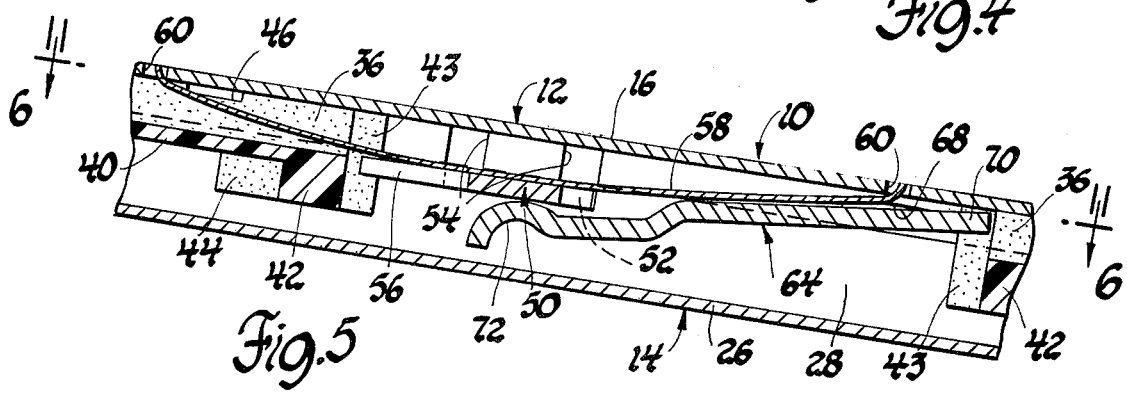
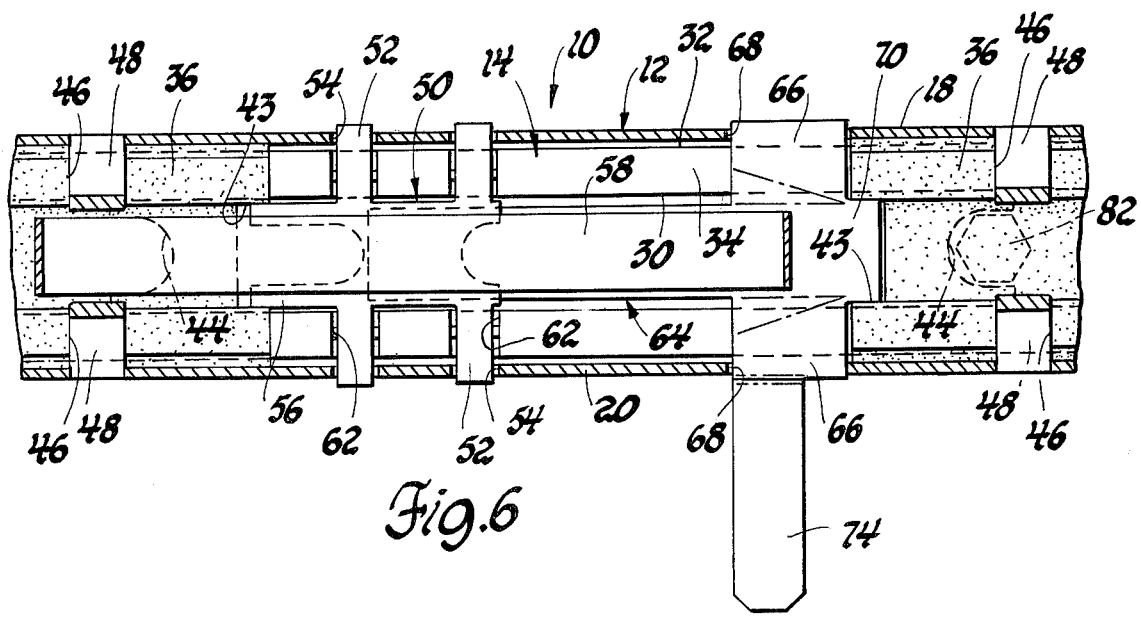

SEAT SLIDE STRUCTURE

This invention relates generally to seat slide structures and more particularly to a seat slide structure including upper and lower track members which are horizontally adjustable relative to each other and releasably latchable in any one of a plurality of horizontally adjusted positions.

Seat slide structures of this general type are well known. However, the seat slide structure of this invention includes several additional features.

One feature is that the upper and lower track members have generally U-shaped legs which interfit with each other, with the legs of the upper track member being located inwardly of the base thereof as well as opening to such base while the legs of the lower track member are located outwardly thereof and open outwardly of the base thereof. Another feature is that the interfitting legs are located laterally of each other and slidably supported relative to each other by longitudinally spaced pairs of plastic slides which interfit between the base of the upper track member and the bights of the legs of the lower track member, with the slides having grooves which receive such bights. A further feature is that the slides and upper track member are locked to each other by interfitting ribs and grooves. Yet another feature is that a vertically reciprocable light weight latch member is located within the upper track member for movement between locked and released positions relative to the lower track member. Yet a further feature is that the latch member includes spaced pairs of locking portions which are received within spaced pairs of locking notches in the bights of the legs of the lower track member to provide a dual locking arrangement between the upper and lower track members. Still another feature is that a biasing spring is located between the latch member and the base of the upper track member to bias the latch member to locked position. Still a further feature is that a release lever is pivotally mounted on the upper track member and is engageable with the latch member to lift the latch member against the bias of the spring and release the locking portions thereof from the locking notches of the lower track member to permit horizontal adjustment of the upper track member and slides relative to the lower track member.

These and other features will be readily apparent from the following specification and drawings wherein:

FIG. 1 is a side elevational view of a seat slide structure according to this invention with parts thereof broken away.

FIG. 2 is a top plan view with parts thereof broken away.

FIG. 3 is an enlarged sectional view taken generally along the plane indicated by line 3—3 of FIG. 1.

FIG. 4 is an enlarged sectional view taken generally along the plane indicated by line 4—4 of FIG. 1.

FIG. 5 is a sectional view taken generally along the plane indicated by line 5—5 of FIG. 4, and FIG. 6 is an enlarged broken away view of a portion of FIG. 2.

Referring now particularly to FIGS. 1 and 2 of the drawings, a seat slide structure 10 according to this invention includes an upper track member 12 and a lower track member 14. As best shown in FIGS. 3 and 4, the upper track member 12 includes a base 16 and a U-shaped leg 18 extending laterally from each side of the base. Each leg includes an outer leg portion 20 and an inner terminal leg portion 22 which is joined to the outer leg portion across a bight 24. The legs 18 are located inwardly relative to the base 16 and open inwardly toward such base.

The lower track member 14 likewise includes a base 26 which is juxtaposed to the base 16 of the upper track member and U-shaped legs 28 which interfit with the legs 18. Each leg 28 includes an inner leg portion 30 juxtaposed to an inner terminal leg portion 22 of a leg 18 of the upper track member and an outer terminal leg portion 32 which interfits between the leg portions 20 and 22 of respective leg 18 of the upper track member. The leg portions 30 and 32 are joined to each other across bights 34.

Front and rear plastic slide assemblies interfit between the upper and lower track members 12 and 14 in order to slidably mount the upper track member 12 on the lower track member. Each such slide assembly, FIG. 3, includes a pair of slides 36 which fit between the base 16 of the upper track member and the bights 34 of the lower track member. Each slide includes a groove 38 slidably engaging a respective bight 34. The slides space the U-shaped legs 18 and 28 vertically and horizontally laterally of each other without binding. The slides 36 are integrally connected to each other by an integral web 40. Such web includes a thickened portion 42 at one end thereof which is cut away to provide a vertically extending slot or groove 43 and a recess 44 for purposes to be described. The slide assemblies are alike and asymmetrically arranged.

Each slide 36 as shown in FIG. 2 includes a spaced pair of grooves or recesses 46 which receive slightly indented integral ribs 48 of the base 16 of the upper track member to locate the slides longitudinally relative to the upper track member.

From the foregoing description it can be seen that the upper and lower track members 12 and 14 can be formed of sheet metal in a rolling mill or extruded. The ribs 48 can be formed before the upper track member is passed through the rolls. The slides 36 can be molded of any generally self-lubricating plastic material and it will be again noted that the slides are alike although they are asymetrically located with respect to each other.

A generally H-shaped light weight latch member 50 is located within the upper track member 12 above the bights 34 of the lower track member. The latch member 50 includes spaced pairs of outwardly extending locking legs 52 which extend outwardly of legs 18 through vertically elongated slots 54. The cooperation of the locking portions 52 and slots 54 locates the latch member 50 longitudinally of the upper track member and mounts the latch member 50 on the upper track member for vertical reciprocating movement between locked and released positions as will be described. The latch member is located laterally of the upper track member by a portion or extension 56 thereof extending into the lateral groove 43 of the web 40 of the front slide assembly. A bowed leaf spring 58, FIG. 5, fits between the latch member 50 and the base 16 of the upper track member 12 to bias the latch member 50 downwardly to locked position. The bent ends of the spring 58 are anchored in slots 60 in the base 16 of the upper track member. When the latch member 50 is in locked position, the locking portions 52 thereof are received within successive pairs of laterally aligned locking notches 62 which are provided in the bights 34 of the lower track member 14 and in the edges of leg portions 22 of legs 18, FIG. 3. By providing spaced pairs of locking portions 52 and notches 62, a dual locking arrangement is obtained between the upper and lower track members. This locking feature is aided by gravity and the bias of the spring 58.

A release lever 64 includes a pair of oppositely extending ears or portions 66 which extend outwardly through transversely aligned slots 68 in the legs 18 in order to mount the release lever 64 to the upper track member. The slots 68 are slightly vertically larger than the thickness of the portions 66 to permit a slight tilting movement of the release lever. The release lever further includes a portion or extension 70 which is received within the vertical slot or groove 43 of the rear slide assembly in order to position the lever 64 laterally of the upper track member, FIG. 6. The lever 64 also includes an arcuate end portion 72 which underlies the latch member 50 and is spaced therefrom. A suitable manually operable handle, not shown, is secured to an extension 74 of one portion 66 of the release lever 64. Upon operation of such handle, the lever 64 is slightly tilted upwardly about the floating pivotal connection provided by portions 66 and slots 68 to in turn engage and shift the latch member 50 vertically upwardly as portions 52 move within slots 54 and out of engagement with the locking notches 62 of the lower track member. This releases the upper track member 12 and the slide assemblies for movement as a unit relative to the lower track member 14 to another horizontally adjusted position. Since the end portion 72 of lever 64 is spaced from latch member 50, gravity and the bias of spring 58 do not act on lever 64 but act only on latch member 50 to maintain it in locked position. Since the latch member 50 is of light weight, such as 7 grams, it has low inertia. Therefore, it is unlikely that the latch member will ratchet past one or more of the slots 54 should the upper track be subjected to high G loading.

The lower track member is mountable on the floor pan 76 of a body by means of front and rear brackets 78 of generally open U section. The lower legs of these brackets are suitably bolted at 80 to the floor pan as shown in FIG. 2 while the upper legs are bolted at 82 to the base 26 of the lower track member. As shown in FIGS. 3, 4 and 6, the heads of the bolts 82 are located above the base 26 of the lower track member. The engagement of these heads with the recesses 44 of the webs 40 of the front and rear pairs slide assemblies respectively provide rear and front stops limiting movement of the upper track member 12 relative to the lower track member 14.

Thus this invention provides an improved seat slide structure.

The embodiments of the invention in which an exclusive property or privilege is claimed are defined as follows:

1. A seat slide structure comprising, in combination, an elongated track member having a base and a generally U-shaped cross-section leg extending laterally from each side of the base and located inwardly thereof, each leg opening to the base of the track member,
    a second elongated track member having a base and a generally U-shaped cross-section leg extending laterally from each side of the base and located outwardly thereof, each leg opening outwardly of the base of the second track member, the base of the second track member being juxtaposed to the base of the first track member and the U-shaped legs of the first and second track members interfitting with each other,
    slide means interfitting between the base of the first track member and the bight of each U-shaped leg of the second track member to slidably mount the first track member on the second track member,
    the bights of the legs of the second track member each being provided with a longitudinal series of locking notches, the notches of the bights being arranged in pairs transversely of the second track member,
    a latch member including at least one pair of outwardly extending locking portions which are movable within vertically elongated slots provided in the legs of the first track member to mount the latch member for movement between a locking position wherein such locking portions are received within a pair of locking notches of the second track member and a released position wherein such portions are free of engagement with any pair of such locking notches to permit horizontal movement of the first track member relative to the second track member,
    means biasing the latch member toward locked position, and
    means for moving the latch member to released position.

2. A seat slide structure comprising, in combination, an elongated track member having a base and a generally U-shaped cross-section leg extending laterally from each side of the base and located inwardly thereof, each leg opening to the base of the track member,
    a second elongated track member having a base and a generally U-shaped cross-section leg extending laterally from each side of the base and located outwardly thereof, each leg opening outwardly of the base of the second track member, the base of the second track member being juxtaposed to the base of the first track member and the U-shaped legs of the first and second track members interfitting with each other,
    slide means of low friction plastic material including a pair of slide members, each engaging the base of the first track member and including a groove slidably engaging a respective bight of a respective U-shaped leg of the second track member to slidably mount the first track member on the second track member,
    the second track member being provided with a longitudinal series of locking notches,
    a latch member mounted on the first track member for movement between a locking position engaged with the locking notches of the second track member and a released position free of engagement with such locking notches,
    means biasing the latch member toward locked position, and
    means for moving the latch member to released position.

3. A seat slide structure comprising, in combination, an elongated track member having a base and a generally U-shaped cross-section leg extending laterally from each side of the base and located inwardly thereof, each leg opening to the base of the track member,
    a second elongated track member having a base and a generally U-shaped cross-section leg extending laterally from each side of the base and located outwardly thereof, each leg opening outwardly of the base of the second track member, the base of the second track member being juxtaposed to the base of the first track member and the U-shaped legs of the first and second track members interfitting with each other, slide means slidably mounting the first track member on the second track member, the bights of the legs of the second track member each being provided with a series of longitudinally spaced pairs of locking notches, a latch member including spaced pairs of outwardly extending locking portions which are movable within spaced pairs of vertically elongated slots of the first track member to mount the latch member for movement between a locking position wherein such spaced pairs of locking portions are received within spaced pairs of locking notches of the second track member, and a released position wherein such locking portions are free of such engagement to permit horizontal movement of the first track member relative to the second track member, means biasing the latch member toward locked position, and means for moving the latch member to released position.

4. A seat slide structure comprising, in combination, an elongated track member having a base and a generally U-shaped cross-section leg extending laterally from each side of the base and located inwardly thereof, each leg opening to the base of the track member, a second elongated track member having a base and a generally U-shaped cross-section leg extending laterally from each side of the base and located outwardly thereof, each leg opening outwardly of the base of the second track member, the base of the second track member being juxtaposed to the base of the first track member and the U-shaped legs of the first and second track members interfitting with each other, slide means slidably mounting the first track member on the second track member, the bights of the legs of the second track member each being provided with a series of longitudinally spaced pairs of locking notches, a latch member including spaced pairs of outwardly extending locking portions which are movable within spaced pairs of vertically elongated slots of the first track member to mount the latch member for movement between a locking position wherein such spaced pairs of locking portions are received within spaced pairs of locking notches of the second track member, and a released position wherein such locking portions are free of such engagement to permit horizontal movement of the first track member relative to the second track member, spring means seating between the base of the first track member and the latch member and biasing the latch member toward locked position, and a release lever pivotally mounted on the first track member and engageable with the latch member opposite the bias of the spring means to lift the latch member to released position against such bias.

* * * * *